United States Patent [19]

Havel

[11] Patent Number: 4,791,667
[45] Date of Patent: Dec. 13, 1988

[54] FIRST DIALED DIGIT DETECTOR AND COMPARATOR

[76] Inventor: Karel Havel, P.O. Box 66, Station M, Toronto, Ontario, Canada, M6S 4T2

[21] Appl. No.: 139,584

[22] Filed: Dec. 30, 1987

Related U.S. Application Data

[62] Division of Ser. No. 839,526, Mar. 14, 1986, Pat. No. 4,726,059.

[51] Int. Cl.⁴ .............................................. H04M 1/26
[52] U.S. Cl. .................................... 379/361; 379/200; 379/368
[58] Field of Search ............... 379/200, 368, 354, 353, 379/199, 355, 361

[56] References Cited

U.S. PATENT DOCUMENTS

| | | | |
|---|---|---|---|
| 4,160,879 | 7/1979 | Sullivan et al. | 379/354 |
| 4,232,200 | 11/1980 | Hestad et al. | 379/353 X |
| 4,246,445 | 1/1981 | Hayasaka et al. | 379/200 |
| 4,482,787 | 11/1984 | Sagara et al. | 379/200 |
| 4,726,059 | 2/1988 | Havel | 379/354 |

FOREIGN PATENT DOCUMENTS 2086187  5/1982  United Kingdom ............... 379/200

Primary Examiner—James L. Dwyer

[57] ABSTRACT

A device for use in a telephone detects the first dialed digit and compares it with a reference value stored in a memory to determine the type of a telephone call.

2 Claims, 2 Drawing Sheets

FIRST DIALED DIGIT DETECTOR AND COMPARATOR

CROSS-REFERENCE TO RELATED APPLICATION

This is a division of my copending application Ser. No. 06/839,526 filed on Mar. 14, 1986 and entitled Variable Color Display Telephone U.S. Pat. No. 4,726,059.

BACKGROUND OF THE INVENTION

1. Field of the Invention

This invention generally relates to telephones and more specifically to a device for detecting the first dialed digit and for comparing it with a reference value to determine the type of a telephone call.

2. Description of the Prior Art

Commercially well known telephone has a capability to establish a telephone call of a selective type in accordance with the first dialed digit.

A telephone display accessory disclosed in U.S. Pat. No. 4,160,879 issued on July 10, 1979 to Ronald L. Sullivan et al. utilizes a binary counter to count pulses produced by a rotary dial in order to distinguish, by the absence or presence of a 1 as the first digit dialed, local calls, long distance calls within the calling area, and long distance calls outside the calling area.

The technique of counting dialed pulses is not usable in a DTMF (Dual Tone Multi-Frequency) dialing system.

SUMMARY OF THE INVENTION

It is the principal object of the invention to provide a device for use in a DTMF telephone for detecting the first keyed digit and for interrogating it to determine the type of a telephone call.

Another object of the invention is to provide a memory for storing selective reference values with which the first dialed digit may be compared.

Other objects of the invention will become obvious from the accompanying drawings and their description.

In summary, the device of the invention includes a keyboard, for successively keying digits of a selective telephone number, a digit counter, which is reset by an off-hook signal and set immediately after the keying of the first digit for the rest of the keying sequence, a memory, and a comparator. When enabled by the digit counter in its reset condition, the comparator compares the first keyed digit of the telephone number with the reference value stored in the memory. The result of the comparison may be stored in a first digit memory for future use.

BRIEF DESCRIPTION OF THE DRAWINGS

In the drawings in which is shown the preferred embodiment of the invention.

Throughout the drawings, like characters indicate like parts.

DESCRIPTION OF THE PREFERRED EMBODIMENT

Telephone set in a business environment, usually connected to a local exchange such as a PBX (Private Branch Exchange), is capable of selectively dialing telephone numbers for establishing either internal calls within the business network or external (trunk) calls to an external Central Office. External calls are usually distinguished by firstly dialing a predetermined digit (typically "9"), followed by the telephone number of a called party. Internal calls are usually dialed directly.

The term "dialing", as used throughout the description of the invention, is used in its widest sense so as to include rotary dialing, keying on a telephone keyboard or keypad, using abbreviated codes, automatic dialing, and the like.

Figure 1:
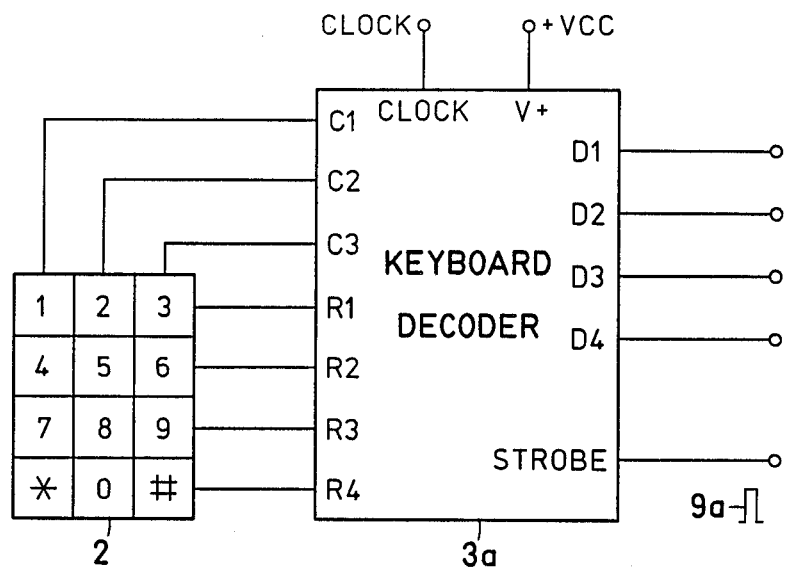
FIG. 1 is a schematic diagram of a keyboard decoder.

Referring now, more particularly, to the drawings, in FIG. 1 is shown a schematic diagram of a telephone keyboard decoder which includes a keyboard decoder chip 3a having four row inputs R1, R2, R3, and R4 and three column inputs C1, C2, and C3 connected to twelve keyswitches, arranged in four rows and three columns, of keyboard 2. A periodic sequence of clock pulses of a suitable frequency is applied to the CLOCK input. When a single key of keyboard 2 is actuated, keyboard decoder 3a develops at its outputs D1, D2, D3, and D4 a binary code unique to the actuated key. A positive going strobe pulse 9a of a short duration is produced at the STROBE output when the key was actuated for at least a predetermined time, to indicate that the output code is valid. The keyboard 2 further may have its outputs coupled to a DTMF generator (not shown), for generating DTMF tones unique to the actuated key, which may be coupled to a telephone line in a manner well understood by those skilled in the art.

Figure 2:
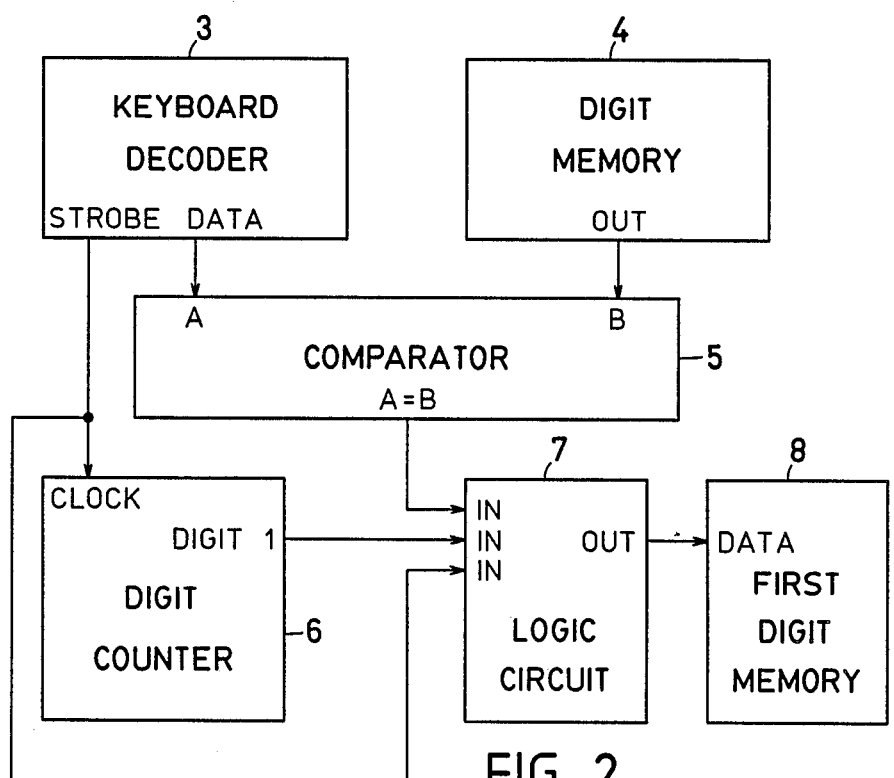
FIG. 2 is an expanded block diagram of a first dialed digit detector and comparator.

The circuit shown in a block diagram configuration in FIG. 2 is used to interrogate the leading dialed digit by comparing it with a predetermined reference value. In practice, the dialed digits are successively decoded by keyboard decoder 3, counted by digit counter 6, and compared by comparator 5 with the reference value stored in digit memory 4. If the first dialed digit after the telephone handset (not shown) goes off-hook is equal to the reference value, logic circuit 7, operatively connected to the output A=B of comparator 5 and to the output DIGIT 1 of digit counter 6, deposits into first digit memory 8 a value indicating that it is an external call. The first digit memory 8 may be restored again to its initial condition when the telephone handset goes on-hook to terminate the call.

Figure 3:
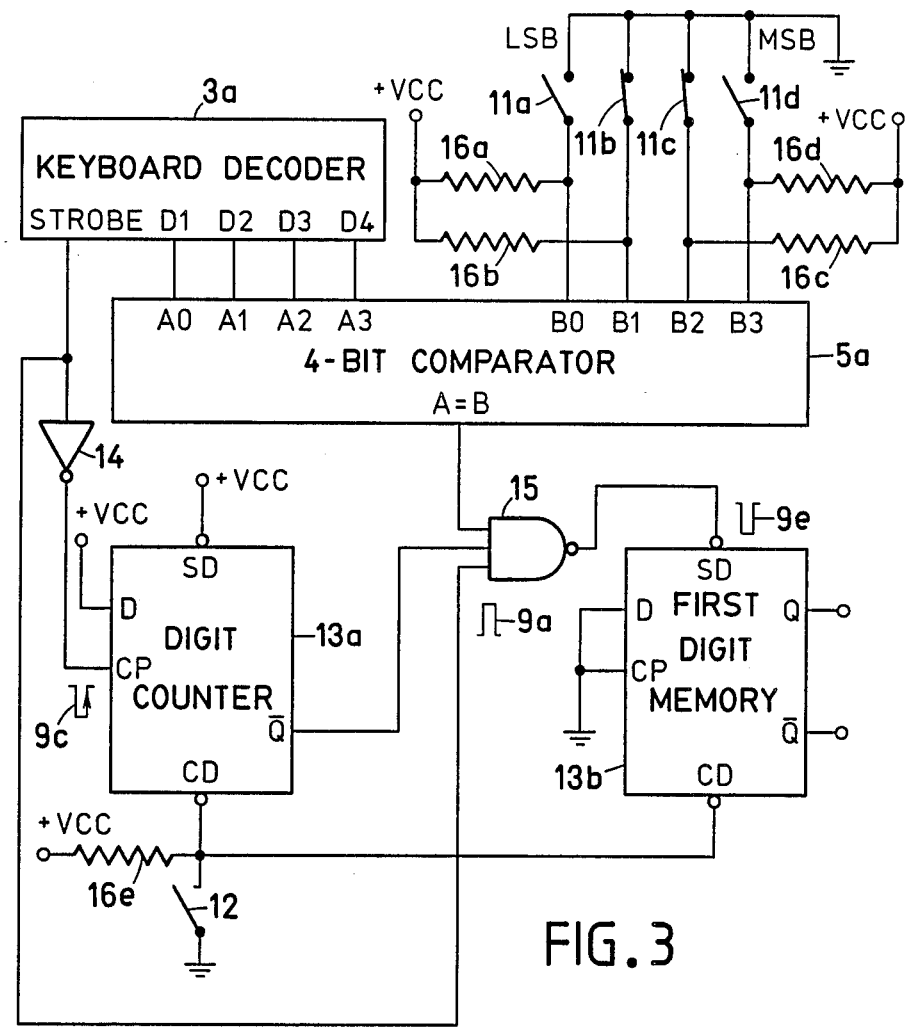
FIG. 3 is a schematic diagram of a first dialed digit detector and comparator circuit.

In the first dialed digit detector circuit shown in a schematic diagram in FIG. 3, an array of manually operated binary switches 11a to 11d is used as a memory for the reference value. In the conditions shown in the schematic diagram, binary switches 11a and 11d are open, to maintain the inputs B0 and B3 of comparator 5a, via pull-up resistors 16a and 16d, at a high logic level, while binary switches 11b and 11c are closed, to force the inputs B1 and B2 to a low logic level. The resulting binary code 1001 applied to the inputs B0 to B3 corresponds to decimal number "9". Initially, both flip-flops 13a and 13b are reset by having their interconnected Clear Direct inputs CD grounded via closed ON/OFF hook switch 12 while the telephone handset in on-hook (not shown); when the handset is lifted, switch 12 opens to drive the CD inputs to a high logic level via pull-up resistor 16e. When the first dialed digit appears at the outputs D1, D2, D3, and D4 of keyboard decoder 3a, which are respectively applied to the inputs A0, A1, A2, and A3 of comparator 5a, the latter effects a comparison between its A and B inputs. When the A and AB inputs are not equal, the output A=B of comparator 5a remains at a low logic level, thereby inhibiting NAND gate 15 and causing its output to remain at a high logic level. However, when the A and B inputs are equal, the output A=B of comparator 5a rises to a high logic level to indicate that the first dialed digit was "9". The NAND gate 15 thus has its first two inputs high, and when strobe 9a appears at its third input, its output drops to a low logic level to provide a pulse 9e for setting via Set Direct input SD first digit memory 13b. The trailing edge of pulse 9c, which was obtained by inverting via inverter 14 strobe pulse 9a, sets digit counter 13a, causing its complementary output $\overline{Q}$ to drop to a low logic level to inhibit NAND gate 15 for the rest of the dialing sequence. It is thus obvious that first digit memory 13b indicates, immediately after the dialing of the first digit, the type of the call to be established: first digit memory 13b in its reset condition indicates an internal call and in its set condition indicates an external call.

When considering a telephone system in which long distance calls are initiated by dialing number "1" followed by a 3-digit area code and 7-digit local telephone number, the first digit detector and comparator shown in FIG. 3 may be readily modified to distinguish long distance calls from local calls by comparing the first dialed digit with reference value "1". This can be accomplished by setting binary switches 11a to 11d to present binary number 0001 (decimal 1) at the inputs B0 to B3 of comparator 5a (by opening binary switch 11a and by closing the remaining binary switches 11b, 11c, and 11d).

In summary, the device of the invention includes a keyboard for successively keying digits of a selective telephone number, digit counter for detecting the first keyed digit of the telephone number, a memory for storing a reference value, and a comparator for comparing the first keyed digit of the telephone number with the reference value.

It would be obvious that persons skilled in the art may resort to modifications in the construction of the preferred embodiment shown herein, without departing from the spirit and the scope of the invention as defined in the appended claims.

CORRELATION TABLE
This is a correlation table of reference characters, their descriptions, and examples of commercially available parts.

| # | DESCRIPTION | EXAMPLE |
|---|---|---|
| 2 | 4 rows × 3 columns keyboard | |
| 3 | keyboard decoder | |
| 3a | Motorola keyboard decoder | 14419 |
| 4 | digit memory | |
| 5 | comparator | |
| 5a | 4-bit comparator | 74HC85 |
| 6 | digit counter | |
| 7 | logic circuit | |
| 8 | first digit memory | |
| 9 | pulse | |
| 11 | binary switch | |
| 12 | ON/OFF hook switch | |
| 13 | D-type flip-flop | 74HC74 |
| 14 | inverter | 74HC04 |
| 15 | 3-input NAND gate | 74HC10 |

What I claim is:

1. In a telephone device, the combination comprising:
a keyboard for successively keying digits of a selective telephone number;
a keyboard decoder coupled to said keyboard and having decoder outputs for developing output data unique to the keyed digit and a strobe output for developing a single strobe pulse for each keyed digit that is valid;
a memory for storing data representing a reference value, said memory having memory outputs indicative of said reference value;
a digit counter coupled to said strobe output for counting said strobe pulses and having a counter output for developing counter signals indicative whether the instant keyed digit is the first keyed digit of the telephone number; and
a comparator responsive to said decoder outputs, to said counter output, and to said memory outputs, for comparing, when said counter signals indicate the first keyed digit, said output data with said reference value and for accordingly developing comparison signals indicative whether the first keyed digit of the telephone number is equal to said reference value.

2. In a telephone device, the combination comprising:
a keyboard for successively keying digits of a selective telephone number;
a keyboard decoder coupled to said keyboard and having decoder outputs for developing output data unique to the keyed digit and a strobe output for developing a single strobe pulse for each keyed digit that is valid, said strobe pulse having a trailing edge indicating the conclusion of the keying of the instant keyed digit;
a memory for storing data representing a reference value, said memory having memory outputs indicative of said reference value;
a digit counter capable of assuming either a first condition or a second condition;
means for transferring said counter to its first condition at the beginning of the keying of the telephone number;
said counter being responsive to said strobe output for being transferred to its second condition by the trailing edge of the first strobe pulse, whereby said counter is in its first condition during the keying of the first digit of the telephone number and in its second condition after the keying of the first digit of the telephone number; and
a comparator responsive to said decoder outputs, to said counter output, and to said memory outputs, for comparing said output data with said reference value and for accordingly developing, when said counter is in its first condition, comparison signals indicative whether the first keyed digit is equal to said reference value.

* * * * *